United States Patent [19]
Ayres et al.

[11] 3,903,806
[45] Sept. 9, 1975

[54] PLEATED, VARIABLE SPEED CONVEYOR AND CONVEYOR DRIVING MEANS

[75] Inventors: Robert U. Ayres, Washington, D.C.; Richard P. McKenna, Bethesda, Md.; Sammie G. Keahey, Landenberg, Pa.

[73] Assignee: Variflex Corporation, Roxbury, Conn.

[22] Filed: Jan. 17, 1974

[21] Appl. No.: 434,105

[52] U.S. Cl. ............... 104/25; 104/167; 198/16 MS; 198/110
[51] Int. Cl. ............................................. B65g 17/06
[58] Field of Search ............ 104/18, 20, 25, 30, 31, 104/167; 198/16 MS, 18, 110

[56] References Cited
UNITED STATES PATENTS

| | | | |
|---|---|---|---|
| 3,422,947 | 1/1969 | Kraft et al. | 104/25 X |
| 3,541,962 | 11/1970 | Avery | 104/20 X |
| 3,583,543 | 6/1971 | Angioletti | 104/25 X |
| 3,793,961 | 2/1974 | Salvadorini | 198/16 MS X |

FOREIGN PATENTS OR APPLICATIONS

| | | | |
|---|---|---|---|
| 711,987 | 6/1965 | Canada | 198/110 |

*Primary Examiner*—M. Henson Wood, Jr.
*Assistant Examiner*—Randolph A. Reese
*Attorney, Agent, or Firm*—Gerald J. Ferguson, Jr.; Joseph J. Baker

[57] ABSTRACT

A pleated, variable speed conveyor and means for driving the conveyor including screw drives and variable width, variable speed belts.

17 Claims, 14 Drawing Figures

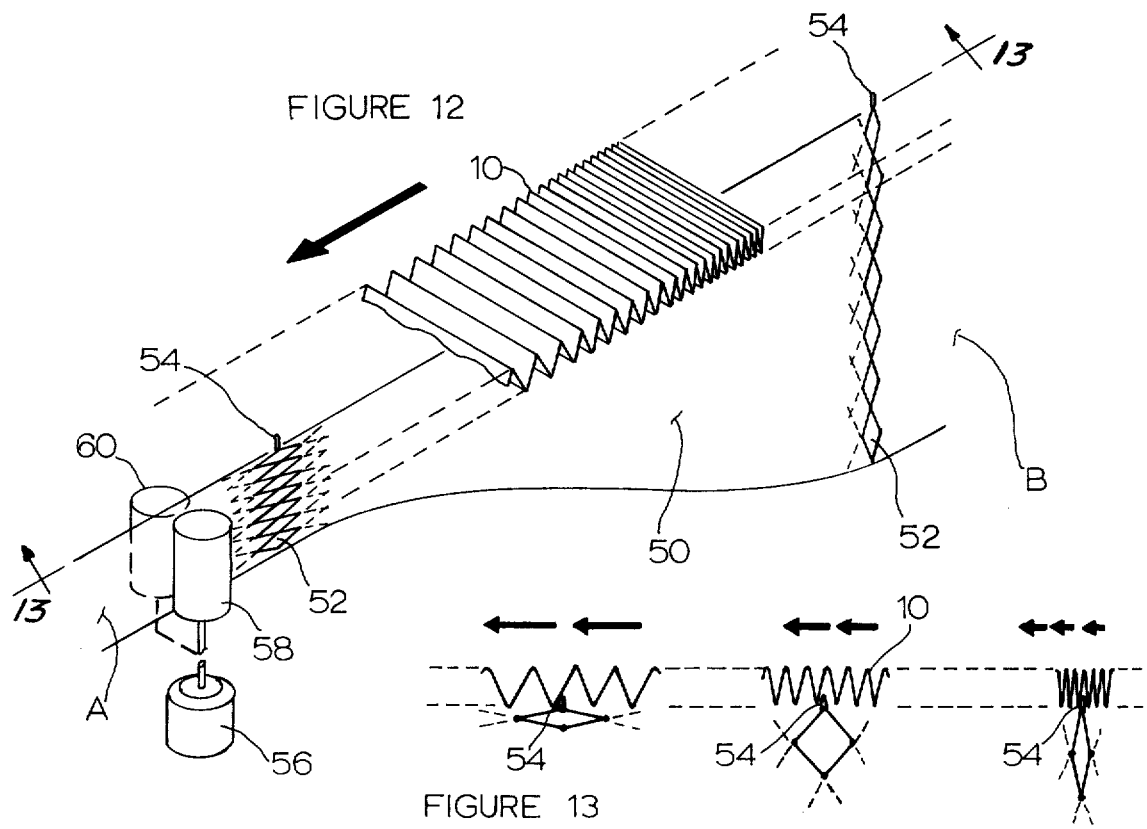
FIGURE 12
FIGURE 13
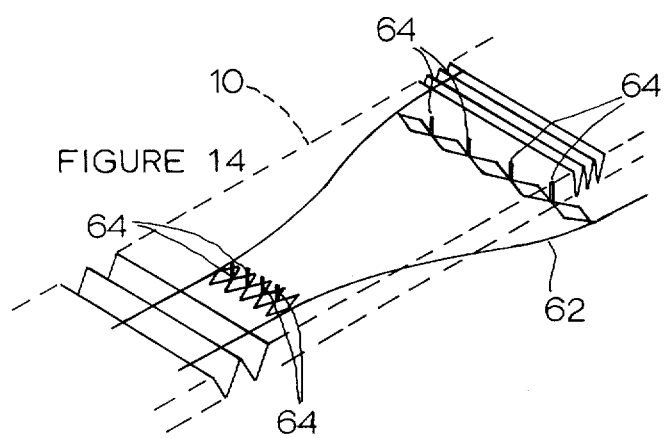
FIGURE 14

PLEATED, VARIABLE SPEED CONVEYOR AND CONVEYOR DRIVING MEANS

CROSS REFERENCE TO RELATED PATENT APPLICATION

This application is related to copending U.S. Reissue application Ser. No. 137,267 (now U.S. Pat. No. RE 27,944) filed Apr. 26, 1971, and based on U.S. Pat. No. 3,465,689 granted Sept. 9, 1969, to Robert U. Ayres and Richard P. McKenna. The foregoing are hereby incorporated herein by reference.

BACKGROUND OF THE INVENTION

1. Field of the Invention

This invention is related to moving variable speed conveyors and to means for driving such conveyors.

2. Discussion of the Prior Art

Various United States patents directed to the moving, variable speed conveyors and drive means therefor are as follows: U.S. Pat. Nos. 1,383,220 granted to Lamar; 1,412,896 granted to Sacks; 1,718,085 granted to Sene; 2,973,720 granted to Bourassa; 2,981,202 granted to Turner; 3,238,893 granted to Zuppigek; 3,247,947 granted to Fox; and 3,516,363 granted to Van der Wal.

Many of these patents disclose conveyors which are difficult to construct and/or which are not readily adapted to variable speed operation and direction change.

SUMMARY OF THE INVENTION

It is thus a primary object of this invention to provide an improved variable speed conveyor which is simple to construct and which readily lends itself to variable speed operation and direction change.

It is a further object of this invention to provide improved drive means for variable speed conveyors.

It is a further object of this invention to provide improved support means for such conveyors.

Other objects and advantages of this invention will become apparent upon reading the appended claims in conjunction with the following detailed description and the attached drawing.

BRIEF DESCRIPTION OF THE DRAWING

FIG. 12 is a schematic perspective view of further drive means for the conveyor of FIG. 1.

FIG. 13 is a partial side view along the line 13—13 of FIG. 12 illustrating the connection of the drive means to the conveyor belt.

FIG. 14 is a schematic perspective of another drive means for the conveyor of FIG. 1.

DETAILED DESCRIPTION OF PREFERRED EMBODIMENTS

Figure 1:
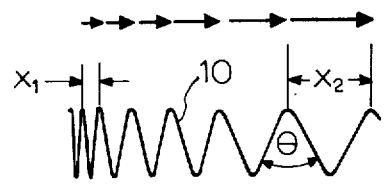
FIG. 1 is a schematic side view of an illustrative pleated conveyor in accordance with the invention.

Reference should now be made to the drawing where like reference numerals refer to like parts.

Figure 2:
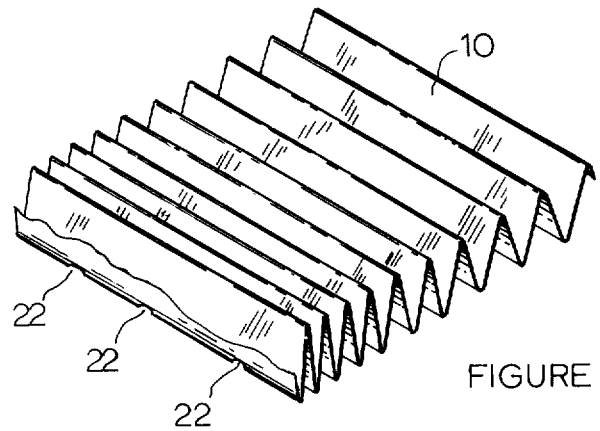
FIG. 2 is a perspective view of the conveyor of FIG. 1.

Referring, in particular, to FIGS. 1 and 2, there are respectively shown a schematic side view and a perspective view of an illustrative conveyor in accordance with the invention. An expansible, corrugated or pleated belt 10 is shown. Belt 10 may be expanded or closed up in motion as shown to move a given point on its surface faster or slower. The spaces between the pleats or folds may be quite small, even at their largest, and still effect a significant velocity change. For example, in the closed position, $x_1$ in FIG. 1 might virtually approach zero. Thus, if $x_1$ were, for example, 0.01 inches, a 5-to-1 expansion, which would yield a fivefold speed increase, would still only produce a gap, $x_2$, of 0.05 inches between neighboring pleats. In effect, a virtually continuous surface would be provided. Even an order of magnitude increase in gap, $x_2$, would only bring $x_2$ to about ½ inch. The actual gap dimensions and degree of expansion depend on the application intended and the material of construction. By keeping the absolute dimensions small, this angle of bending, $\theta$, at each pleat or fold joint may also be kept small. This readily allows simple construction from a single continuous sheet since the degree of bending can be kept well within the material's yield point. Typically, the continuous sheet would be made from a flexible metal, such as sheet steel or the like.

Figure 3:
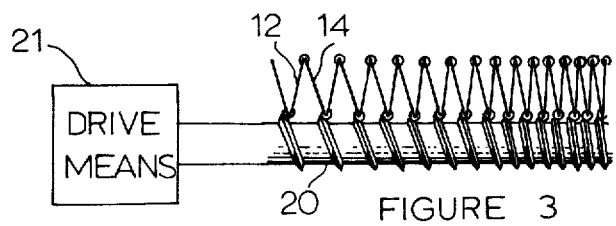
FIG. 3 is a schematic side view of a variable pitch drive screw for varying the speed of the conveyor of FIG. 1.
Figure 4:
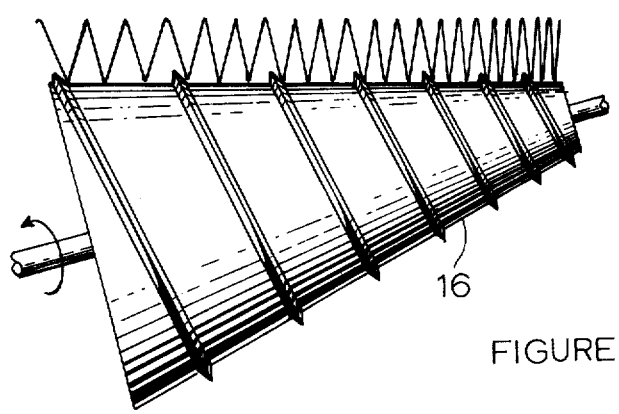
FIG. 4 is a schematic side view of a constant pitch conical drive screw for varying the speed of the conveyor of FIG. 1.
Figure 5:
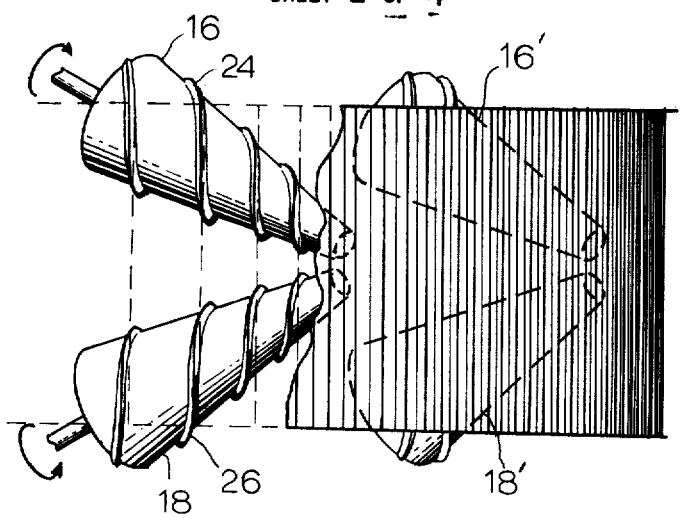
FIGS. 5 and 6 are schematic top views illustrating different implementations of the conical drive screw of FIG. 4.
Figure 6:
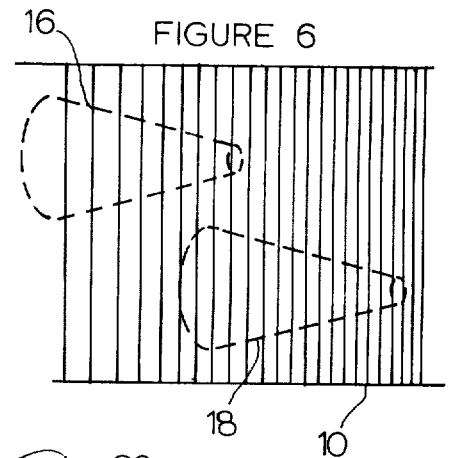
Figure 7:
FIG. 7 is a schematic perspective view of the conveyor of FIG. 1 illustrating the adaptability of the conveyor to direction change.

Further, rather than a continuous sheet, a series of plates may be used as indicated in FIG. 3. Each fold comprises a pair of plates 12 and 14 pivotally connected together at the top and bottom thereof. FIG. 3 also illustrates a schematic side view of a variable pitch drive screw 20 for varying the speed of belt 10. The pleating of belt 10 readily lends itself to propulsion by a screw drive mechanism such as screw 20. A drive means 21 is also indicated at 21 and may be any conventional source of rotary motion. This drive means will not be illustrated in other figures of the drawing. Screw 20 may be a simple linear, variable pitch archimedes screw. Where constant speed drive is required, the pitch of screw 20 should be constant. A plurality of screws 10 may be provided across the width of belt 10, if necessary, for additional support of the belt. Further, openings 22 may be provided along the base of belt 10 as indicated in FIG. 2 to facilitate the removal of dirt and/or debris therefrom. The belt of construction of FIGS. 1 and 3 readily permits curvilinear or turning motion, as shown in FIG. 7. This very adaptability to changing speeds and directions requires that belt 10 be driven by a positive force at all points along the length thereof. There are many mechanisms for effecting this, both at constant and changing speeds. An illustrative drive mechanism is shown in side view in FIG. 4. Referring to FIG. 5, which is a plan view of FIG. 4, a continuously changing speed is provided (decelerating in FIG. 4, but obviously reversal of the drive rotation would effect acceleration) by pairs of angle cones 16 and 18 and 16' and 18' bearing constant-pitch archimedes-screw threads 24 and 26 which engage the bottom joints of the corrugations. The screws may be rotated at constant speed in opposite directions, as shown. The tapering of the cone screw threads 24 and 26 will progressively decrease the forward progression speed of the threads, the distances between which are themselves changing in accord with the altering space requirements of the pleats. Thus, a continuous linear acceleration or deceleration (depending on direction of rotation) of the pleat surface is effected. Cones 16' and 18' are the same as cones 16 and 18 and are so disposed with respect to cones 16 and 18 so that belt 10 is positively driven at all points along the length thereof. Another arrangement for driving belt 10 is indicated in FIG. 6.

Figure 8:
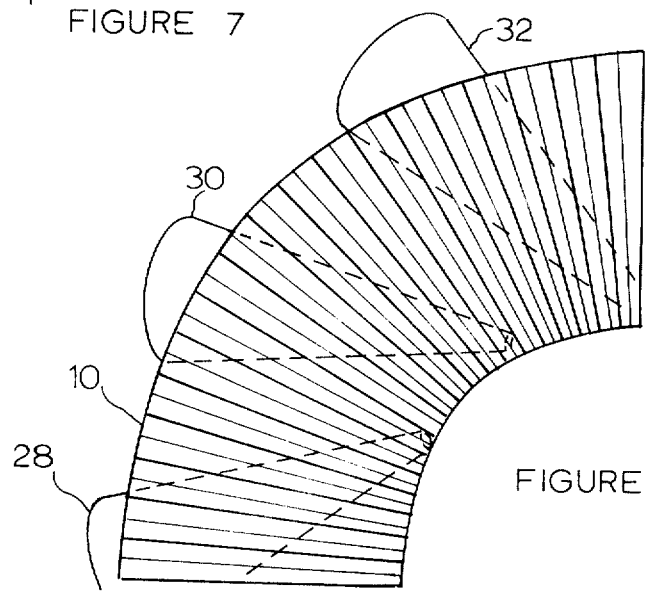
FIG. 8 is a schematic top view illustrating the use of conical drive screws for propelling the conveyor belt of FIG. 1 around a corner.

In order to effect curvilinear motion, a somewhat different drive arrangement is necessary than in the case of either constant speed or linear varying speed. Reference should be made to FIG. 8. Actual speed in curvilinear motion varies directly with the curvature radius. Thus, the inside edge of the conveyor will tend to decelerate while the outside accelerates, or at least remains constant. FIG. 8 illustrates in schematic form a configuration for implementing such turning motion. Here, rotating tapered cones 28, 30, and 32, as in the accelerating/decelerating sections, are mounted at an angle across the conveyor width around the curve. With a suitable combination of cone taper and varying pitch, an appropriate variation in speed with conveyor radius along the line of conveyor motion can be effected depending on the particular application.

Figure 9:
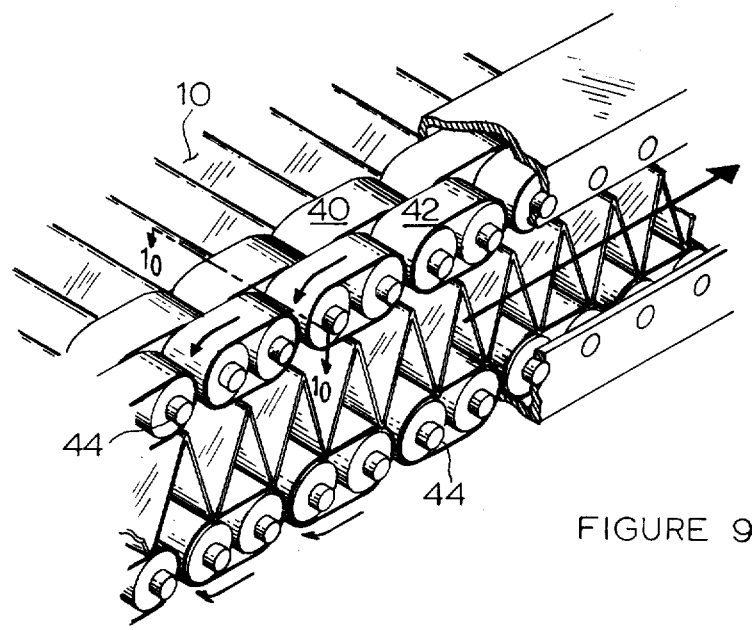
FIG. 9 is a schematic perspective view of support apparatus for the conveyor of FIG. 1.
Figure 10:
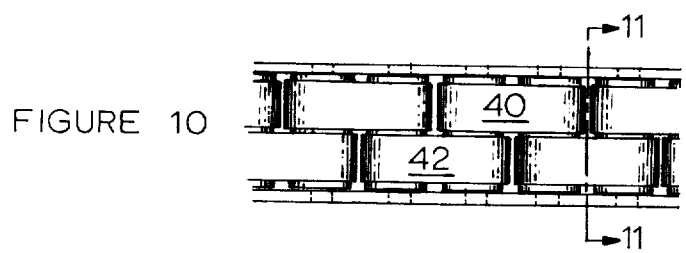
FIG. 10 is a cross-sectional view along the line 10—10 of FIG. 9.
Figure 11:
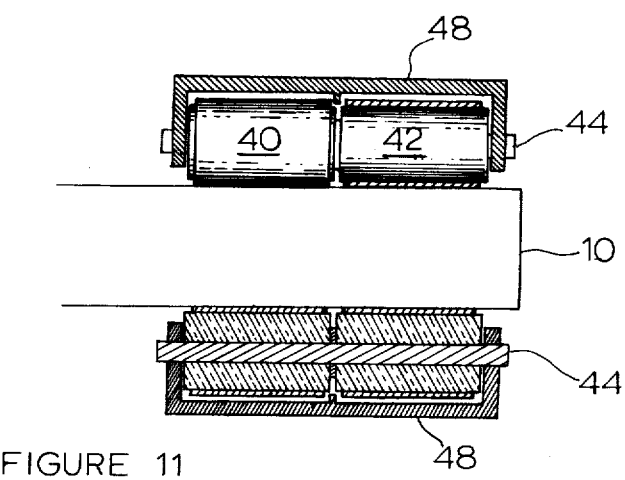
FIG. 11 is a cross-sectional view along the line 11—11 of FIG. 10.

Reference should now be made to FIGS. 9-11 where support means for the belt of FIG. 1 is illustrated. The belt 10 should be both supported from beneath and constrained from above, at least along the edges, to provide strength and to prevent bunching or vertical motion of the entire belt in an upward direction. This could be done by a simple flat restraining surface (a floor beneath and a flat-edged beam along the upper edges). However, this would introduce unwanted drag and frictional effects. An embodiment for eliminating such drag by providing, in effect, rolling contact between the belt and its restraining surfaces is shown in FIGS. 9-11. Two rows 40 and 42 of very short (2-roller) closed loop belts are staggered in a "brickwork" fashion, as shown in FIGS. 9 and 10, such that the support rollers 44 of each loop are shared by two adjacent loops in the adjacent row. The loop belts are free to slide or roll with the motion of the conveyor 10, thus eliminating drag on the conveyor. Nevertheless, the staggered-row support provides an effectively solid supporting and restraining surface for the conveyor. The closed loops are themselves supported in a suitable frame 48, in the walls of which the rollers 44 ride and are free to rotate. Frame 48 may in turn be built into whatever structure supports the conveyor as a whole. The side walls of frame 6 are so designed to allow suitable clearance between it and the corrugation surface of conveyor 10.

Reference should now be made to FIGS. 12 and 13, which illustrate further means for driving the conveyor 10 of FIG. 1 although it should be understood that the driving means of FIGS. 12 and 13 (and FIG. 14, which will be described hereinafter) can be used with all types of conveyors including the pleated conveyor of FIG. 1.

The driving means comprises an expandable belt 50 of the type described in the before-mentioned copending U.S. patent application Ser. No. 137,267. As described in detail in the copending application, the belt 50 comprises a mesh the individual cells 52 of which may be varied in shape as the belt varies in width, as can best be seen in FIG. 13. Although the belt is typically intended for use as a horizontally oriented conveyor in the copending application, the belt 50 in the embodiment of FIGS. 12 and 13 is a vertically oriented driving means. The belt is removably connected to the conveyor 10 by projecting members 54 attached to the edge of the belt which project into the spaces between the folds or pleats of conveyor 10 and which may be removably connected to the folds if desired. The belt 50 changes its configuration (expands or contracts) as the speed thereof is varied. Because of the connection of the belt to the conveyor, the conveyor speed is also varied.

Belt 50 may be driven by a motor 56 which drives a pair of rollers 58 and 60. The rollers are in friction contact with the opposite sides of belt 52 and are preferably coated with an appropriate material to insure optimum contact with the belt. The rollers drive the belt 52 at a speed corresponding to that desired for conveyor 10 at point A. The belt 52 is also driven at point B by motor and roller means similar to that at point A. The driving speed corresponds to that desired for conveyor 10 at point B. Appropriate means for supporting belt 52 such as guideway 14 described in the copending application may also be used.

Reference should now be made to FIG. 14 which illustrates another embodiment for a drive means for conveyor 10, which is shown in phantom lines. A belt 62 of the same type as described in the before-mentioned copending application is used. In this embodiment the belt is horizontally oriented and substantially parallel to the plane of the belt 10.

Projecting members 64 are connected to the nodes of the mesh cells of belt 62 and project into the spaces between the folds or pleats of conveyor 10. The projecting members may be removably connected to the folds of the belt to thereby permit driving of the conveyor 10 by the belt 62. The belt 62 may be driven and supported as described in the copending application.

Numerous modifications of the invention will become apparent to one of ordinary skill in the art upon reading the foregoing disclosure. During such a reading it will be evident that this invention provides a unique variable speed conveyor and driving means therefor for accomplishing the objects and advantages hereinstated.

What is claimed is:

1. A pleated conveyor for the movement of objects including means for varying the speed of the objects from a first speed to a second speed, said conveyor comprising:

a belt for supporting said objects including a plurality of folds of sufficient rigidity to support said objects, said folds being disposed along said belt, each fold being aligned substantially vertical and perpendicular to the direction of motion of said belt and connected to the folds immediately adjacent thereto;

means for moving said belt including said means for varying the spacing between the ridges of successive folds of said belt from a first distance corresponding to said first speed to a second distance corresponding to said second speed; and means for supporting said belt.

2. A conveyor as in claim 1 where said belt comprises a single continuous sheet of material, each said fold being integrally connected to the folds immediately adjacent thereto.

3. A conveyor as in claim 1 where each fold comprises a pair of plates pivotally connected together along their respective longitudinal end portions and said belt includes means for pivotally connecting each fold to the folds immediately adjacent thereto.

4. A conveyor as in claim 1 where said belt moving means includes means for maintaining the movement of said belt at one of said first and second speeds by maintaining the spacing between the ridges of successive folds at one of said first and second distances.

5. A conveyor as in claim 4 where said means for maintaining the movement of said belt at one of said first and second speeds includes at least one cylindrical screw having a constant pitch screw thread, said thread engaging predetermined folds of said belt.

6. A conveyor as in claim 1 where at least a portion of said belt is curvilinear and where said means for moving said belt includes means for varying the curvilinear speed of said belt as a function of the radius of curvature of said curvilinear portion of the belt.

7. A conveyor as in claim 1 where said belt support means includes anti-friction means for maintaining a rolling contact with said belt to minimize friction therebetween.

8. A conveyor as in claim 1 where said means for varying the spacing includes an (1) expandable belt comprising a mesh, the individual cells of which vary in shape as said belt is expanded, said belt being connected to said conveyor, the speed of said belt changing as its configuration is varied, and (2) means for changing the configuration of said belt to thereby vary the speed of the conveyor connected to the belt.

9. A conveyor as in claim 8 where said belt is perpendicularly oriented with respect to said conveyor and the top edge thereof is connected to the bottom of said conveyor.

10. A conveyor as in claim 8 where said belt is substantially parallel to and beneath said conveyor.

11. A pleated conveyor for the movement of objects including means for varying the speed of the objects from a first speed to a second speed, said conveyor comprising:

a belt for supporting said objects including a plurality of folds of sufficient rigidity to support said objects, said folds being disposed along said belt, each fold being substantially perpendicular to the direction of motion of said belt and connected to the folds immediately adjacent thereto;

means for moving said belt including means for varying the spacing between the ridges of successive folds of said belt from a first distance corresponding to said first speed to a second distance corresponding to said second speed, said means for varying the spacing between the ridges of successive folds including at least one pair of conical screws, the threads of which engage predetermined folds of said belt, said screws being so disposed with respect to said belt that linear motion is imparted thereto;

means for supporting said belt.

12. A conveyor as in claim 11 where said pair of conical screws are disposed at opposite sides of said belt, said belt moving means including means for rotating said conical screws in opposite directions.

13. A pleated conveyor for the movement of objects including means for varying the speed of the objects from a first speed to a second speed, said conveyor comprising:

a belt for supporting said objects including a plurality of folds of sufficient rigidity to support said objects, said folds being disposed along said belt, each fold being substantially perpendicular to the direction of motion of said belt and connected to the folds immediately adjacent thereto;

means for moving said belt including means for varying the spacing between the ridges of successive folds of said belt from a first distance corresponding to said first speed to a second distance corresponding to said second speed;

means for supporting said belt; and at least a portion of said belt being curvilinear and said means for moving said belt including means for varying the curvilinear speed of said belt as a function of the radius of curvature of said curvilinear portion of the belt, said means for varying the curvilinear speed of said belt including at least one conical screw having a variable pitch screw thread, said thread engaging predetermined folds of said belt.

14. A pleated conveyor for the movement of objects including means for varying the speed of the objects from a first speed to a second speed, said conveyor comprising:

a belt for supporting said objects including a plurality of folds of sufficient rigidity to support said objects, said folds being disposed along said belt, each fold being substantially perpendicular to the direction of motion of said belt and connected to the folds immediately adjacent thereto;

means for moving said belt including means for varying the spacing between the ridges of successive folds of said belt from a first distance corresponding to said first speed to a second distance corresponding to said second speed; and means for supporting said belt, said belt support means including anti-friction means for maintaining a rolling contact with said belt to minimize friction therebetween, said anti-friction means including a first plurality of rollers disposed beneath said belt at each approximate side thereof, a second plurality of rollers disposed adjacent to and respectively colinear with said first plurality of rollers, a first plurality of belts respectively disposed about successive pairs of said first plurality of rollers, a second plurality of belts respectively disposed about successive pairs of said second plurality of rollers, said first plurality of belts being staggered with respect to said second plurality of belts so that each pair of adjacent first and second belts is disposed about one and only one adjacent colinear pair of first and second rollers.

15. A conveyor as in claim 14 where said anti-friction means is disposed above and below said belt.

16. A pleated conveyor for the movement of objects including means for varying the speed of the objects from a first speed to a second speed, said conveyor comprising:

a belt for supporting said objects including a plurality of folds of sufficient rigidity to support said objects, said folds being disposed along said belt, each fold being substantially perpendicular to the direction of motion of said belt and connected to the folds immediately adjacent thereto;

means for moving said belt including means for varying the spacing between the ridges of successive folds of said belt from a first distance corresponding to said first speed to a second distance corresponding to said second speed, said means for varying the spacing including an (1) expandable belt comprising a mesh, the individual cells of which vary in shape as said belt is expanded, said belt being connected to said conveyor, the speed of said belt changing as its configuration is varied, and (2) means for changing the configuration of said belt to thereby vary the speed of the conveyor connected to the belt, said belt being connected to said conveyor by projecting members connected to said belt which project into the spaces between said folds; and means for supporting said belt.

17. A pleated conveyor for the movement of objects including means for varying the speed of the objects from a first speed to a second speed, said conveyor comprising:

a belt for supporting said objects including a plurality of folds of sufficient rigidity to support said objects, said folds being disposed along said belt, each fold being substantially perpendicular to the direction of motion of said belt and connected to the folds immediately adjacent thereto;

means for moving said belt including means for varying the spacing between the ridges of successive folds of said belt from a first distance corresponding to said first speed of a second distance corresponding to said second speed;

means for supporting said belt; and a plurality of openings being provided at the base of said folds to facilitate the cleaning of said conveyor.

\* \* \* \* \*